US012566341B2

(12) United States Patent
Aleem et al.

(10) Patent No.: US 12,566,341 B2
(45) Date of Patent: Mar. 3, 2026

(54) PREDICTING SIZING AND/OR FITTING OF HEAD MOUNTED WEARABLE DEVICE

(71) Applicant: GOOGLE LLC, Mountain View, CA (US)

(72) Inventors: Idris Syed Aleem, Kitchener (CA); Mayank Bhargava, Kitchener (CA); Sushant Umesh Kulkarni, Waterloo (CA); Ahmed Gawish, Waterloo (CA); Rees Anwyl Samuel Simmons, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 377 days.

(21) Appl. No.: 17/807,230

(22) Filed: Jun. 16, 2022

(65) Prior Publication Data

US 2023/0410355 A1 Dec. 21, 2023

(51) Int. Cl.
*G02C 13/00* (2006.01)
*G02C 7/02* (2006.01)
*G06T 7/60* (2017.01)
*G06V 40/16* (2022.01)

(52) U.S. Cl.
CPC ........... *G02C 13/003* (2013.01); *G02C 7/027* (2013.01); *G06T 7/60* (2013.01); *G06V 40/165* (2022.01); *G06T 2207/20076* (2013.01); *G06T 2207/20081* (2013.01); *G06T 2207/30201* (2013.01)

(58) Field of Classification Search
CPC .... G02C 7/027; G02C 13/003; G02C 13/005; G06T 7/60; G06T 2207/20076; G06T 2207/20081; G06T 2207/30201; G06V 40/165
See application file for complete search history.

(56) References Cited

U.S. PATENT DOCUMENTS

| | | | |
|---|---|---|---|
| 6,944,327 B1 | 9/2005 | Soatto | |
| 2003/0123026 A1 | 7/2003 | Abitbol et al. | |
| 2010/0220285 A1* | 9/2010 | Simmonds ........... | G02C 13/005 351/204 |
| 2014/0293220 A1 | 10/2014 | Kornilov et al. | |
| 2016/0313576 A1 | 10/2016 | Gardner | |

(Continued)

FOREIGN PATENT DOCUMENTS

EP 3916472 A1 12/2021

OTHER PUBLICATIONS

Ramanathan , "How Might We Design Unisex Eyeglasses (For US Population) for a Snug Fit and Comfort With Respect To Facial Features Including the Eyes, Nose and Ears?", (https://abhishekramanathan.com/eye-glasses); downloaded Mar. 2, 2022, 9 pages.

(Continued)

*Primary Examiner* — Katrina R Fujita
(74) *Attorney, Agent, or Firm* — Brake Hughes Bellermann LLP

(57) ABSTRACT

A system and method of predicting the fitting of a head mounted wearable device for a user is provided. The system detects fixed facial landmarks in image data captured by a computing device of the user. Measurements associated with the detected fixed facial landmarks may be processed by one or more machine learning models and associated algorithm(s) to predict the probability of fitting of a head mounted wearable device on the head of the user.

18 Claims, 11 Drawing Sheets

(56)            References Cited

U.S. PATENT DOCUMENTS

| | | | | |
|---|---|---|---|---|
| 2019/0033624 | A1* | 1/2019 | Breuninger | G02C 13/005 |
| 2020/0054209 | A1* | 2/2020 | Zhang | G02C 13/003 |
| 2020/0285081 | A1 | 9/2020 | Fonte et al. | |
| 2021/0065285 | A1 | 3/2021 | Goldberg et al. | |
| 2021/0088811 | A1 | 3/2021 | Varady et al. | |
| 2022/0207331 | A1* | 6/2022 | Andoche | G06V 10/764 |
| 2022/0300728 | A1* | 9/2022 | Assouline | G06T 19/006 |
| 2023/0360350 | A1* | 11/2023 | Kulkarni | G06T 7/579 |
| 2024/0069366 | A1* | 2/2024 | Andoche | G06V 40/193 |

OTHER PUBLICATIONS

International Search Report and Written Opinion for PCT Application No. PCT/US2023/068131, mailed on Sep. 25, 2023, 13 pages.

\* cited by examiner

<u>600</u>

PREDICTING SIZING AND/OR FITTING OF HEAD MOUNTED WEARABLE DEVICE

TECHNICAL FIELD

This description relates in general to the prediction of fit of a wearable device, and in particular to the prediction of wearable fit of a head worn wearable device.

BACKGROUND

Wearable devices may include head worn devices including, for example, glasses including smart glasses, headsets, ear buds and the like, wrist and/or hand worn devices including, for example, watches including smart watches, smart bracelets, smart rings and the like, smart pendants, fitness trackers, cameras, body sensors, and other such devices. A manner in which the wearable device fits a particular user may be dependent on features specific to the user and how the wearable device interacts with the features associated with the specific body part at which the wearable device is worn by the user. A user may want to customize a wearable device for fit and/or function. For example, when fitting a pair of glasses, the user may want to customize the glasses to incorporate selected frame(s), particular types of lenses, and the like, as well as other features such as a display device, computing capabilities, and the like. Many existing systems for procurement of these types of wearable devices do not provide for accurate sizing and/or fitting and/or customization without access to a retail establishment and/or specialized equipment. Existing virtual systems may provide a virtual try-on capability, in which a rendering of the wearable device is superimposed on an image of the user. However, these systems lack the ability to accurately size the wearable device for the user, such that the user is provided with a wearable device that will fit the user properly when received.

SUMMARY

In a first general aspect, a computer-implemented method may include capturing, via an application executing on a computing device operated by a user, image data including a head of the user; applying a scale value to a distance between two fixed landmarks detected in the image data; associating a measurement with the distance between the two fixed landmarks based on the scale value; and predicting, using at least one machine learning model, a probability of fitting a head mounted wearable device on the head of the user based on the measurement associated with the two fixed landmarks.

In some examples, the computer-implemented method may also include detecting the two fixed landmarks in the image data from amongst a plurality of facial landmarks in the image data; and detecting a fit parameter based on a relative position the two fixed landmarks. In some examples, associating the measurement with the distance between the two fixed landmarks includes determining a measurement associated with the fit parameter, the measurement associated with the fit parameter corresponding to the measurement associated with the distance between the two fixed landmarks. In some examples, predicting the probability of the fitting of the head mounted wearable device on the head of the user includes accessing, by the at least one machine learning model, fit scoring data associated with the head mounted wearable device; and determining the probability of fitting based on the fit scoring data and the measurement associated with the fit parameter. In some examples, the fit scoring data includes numerical scores of wearable fit of a plurality of differently configured head mounted wearable devices for a plurality of different measurements associated with the fit parameter. In some examples, the fit scoring data includes numerical scores of wearable fit of the head mounted wearable device across a plurality of different head width measurements.

In some implementations, determining the measurement associated with the fit parameter includes determining at least one of a head width measurement, an inter-lateral commissure distance measurement, or an inter-medial commissure distance measurement based on the plurality of facial landmarks detected in the image data. In some implementations, determining the measurement associated with the fit parameter includes determining a distance between any two of the plurality of facial landmarks having a static distance therebetween; and associating a measurement with the distance between the any two of the plurality of facial landmarks.

In another general aspect, a non-transitory computer-readable medium storing executable instructions that when executed by at least one processor of a computing device are configured to cause the at least one processor to capture, via an application executing on the computing device, image data including a head of a user; apply a scale value to a distance between two fixed landmarks detected in the image data; associate a measurement with the distance between the two fixed landmarks based on the scale value; and predict, using at least one machine learning model, a probability of fitting of a head mounted wearable device on the head of the user based on the measurement associated with the two fixed landmarks.

In some implementations, the instructions cause the at least one processor to detect the two fixed landmarks in the image data from amongst a plurality of facial landmarks in the image data; and detect a fit parameter based on a relative position of the two fixed landmarks. In some examples, the instructions cause the at least one processor to determine a measurement associated with the fit parameter, the measurement associated with the fit parameter corresponding to the measurement associated with the distance between the two fixed landmarks.

In some implementations, the instructions cause the at least one processor to access, by the at least one machine learning model, fit scoring data associated with the head mounted wearable device; and determine the probability of fitting based on the fit scoring data and the measurement associated with the fit parameter. In some examples, the fit scoring data includes numerical scores of wearable fit of a plurality of differently configured head mounted wearable devices for a plurality of different measurements associated with the fit parameter. In some examples, the fit scoring data includes numerical scores of wearable fit of the head mounted wearable device across a plurality of different head width measurements.

In some implementations, the instructions cause the at least one processor to determine at least one of a head width measurement, an inter-lateral commissure distance measurement, or an inter-medial commissure distance measurement based on the plurality of facial landmarks detected in the image data.

In some implementations, the instructions cause the at least one processor to determine a distance between any two of the plurality of facial landmarks having a static distance therebetween; and associate a measurement with the distance between the any two of the plurality of facial landmarks.

In another general aspect, a system may include a computing device, including an image sensor; at least one processor; and a memory storing instructions. The instructions, when executed by the at least one processor, may cause the at least one processor to capture, via an application executing on the computing device, image data including a head of a user of the computing device; apply a scale value to a distance between two fixed landmarks detected in the image data; associate a measurement with the distance between the two fixed landmarks based on the scale value; and predict, using at least one machine learning model, a probability of fitting of a head mounted wearable device on the head of the user based on the measurement associated with the distance between the two fixed landmarks.

In some implementations, the instructions cause the at least one processor to detect the two fixed landmarks in the image data from amongst a plurality of facial landmarks in the image data; detect a fit parameter based on a relative position of the two fixed landmarks; and determine a measurement associated with the fit parameter, the measurement associated with the fit parameter corresponding to the measurement associated with the distance between the two fixed landmarks. In some examples, the instructions cause the at least one processor to access, by the at least one machine learning model, fit scoring data associated with the head mounted wearable device; and determine the probability of fit based on the fit scoring data and the measurement associated with the fit parameter. In some examples, the fit scoring data includes numerical scores of wearable fit of a plurality of differently configured head mounted wearable devices for a plurality of different measurements associated with the fit parameter. In some examples, the instructions cause the at least one processor to determine a distance between any two of the plurality of facial landmarks having a static distance therebetween; and associate a measurement with the distance between the any two of the plurality of facial landmarks.

The details of one or more implementations are set forth in the accompanying drawings and the description below. Other features will be apparent from the description and drawings, and from the claims.

4

Figure 7:
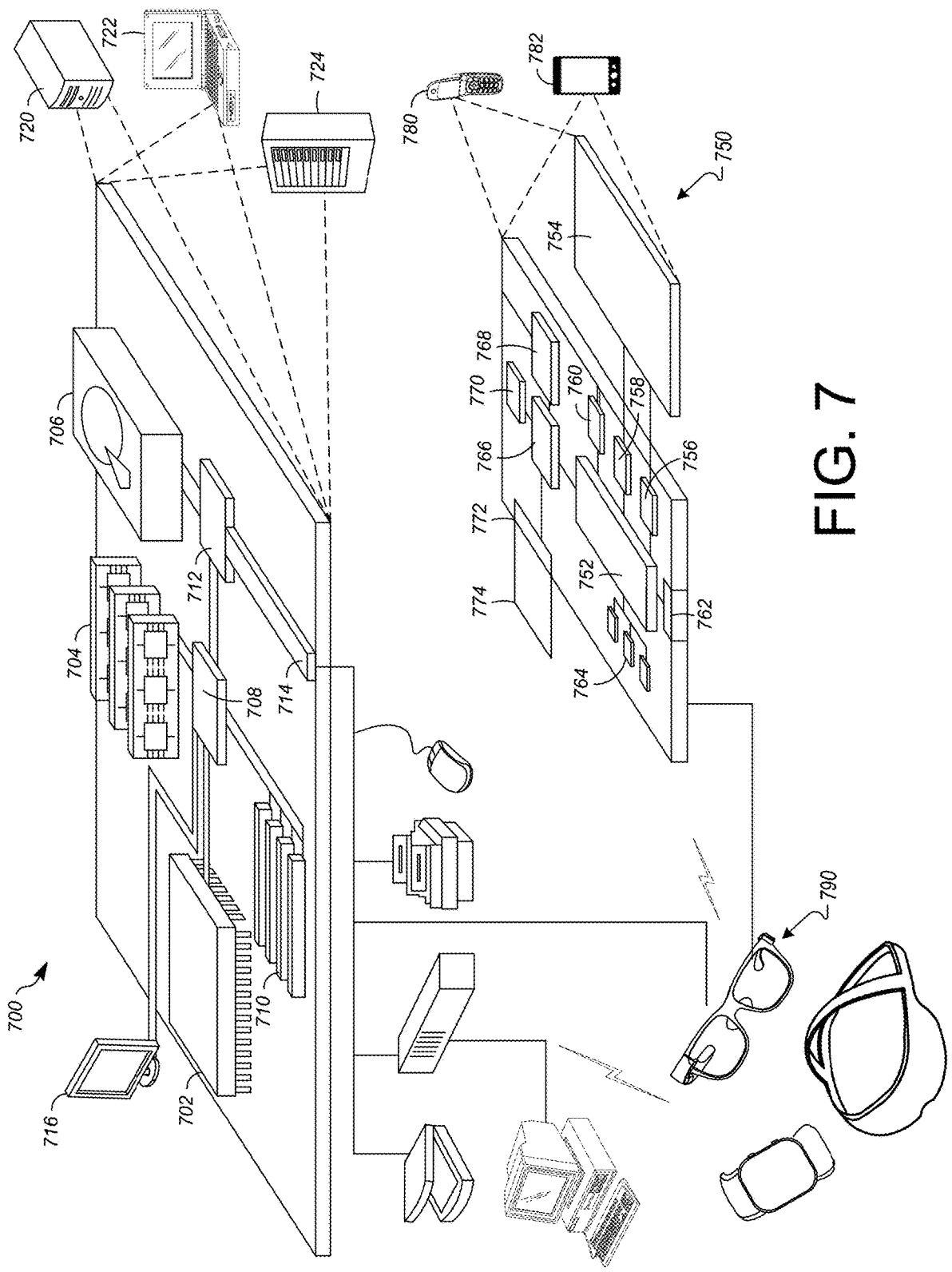

FIG. 7 illustrates example computing devices of the computing systems discussed herein.

DETAILED DESCRIPTION

This disclosure relates to systems and methods for accurately determining sizing and/or fitting for a wearable device, and in particular, for a head mounted wearable device such as glasses. Systems and methods, in accordance with implementations described herein, provide for the determination of sizing and/or fitting parameters for the virtual sizing and/or fitting of a wearable device based on detection of physical attributes of a user detected within image data captured by the user. Determination of sizing and/or fitting parameters using an image based data capture system and method may allow a wearable device, such as, for example, glasses (including smart glasses having display capability and/or computing capability) and other such wearable devices, to be accurately sized and fit for a particular user, without the need to access a physical retail establishment.

Hereinafter, systems and methods, in accordance with implementations described herein, will be described with respect to the sizing and/or fitting of a wearable device in the form of a head mounted display device, such as, for example, glasses (to include smart glasses having display capability and/or computing capability) device. The principles to be described herein may be applied to the virtual sizing and/or fitting of other types of wearable devices. Systems and methods, in accordance with implementations described herein, will be described with respect to the collection of image data using a handheld computing device operated by the user, simply for purposes of discussion and illustration. The principles to be described herein may be applied to other types of computing devices having image data collection capabilities.

Figure 1:
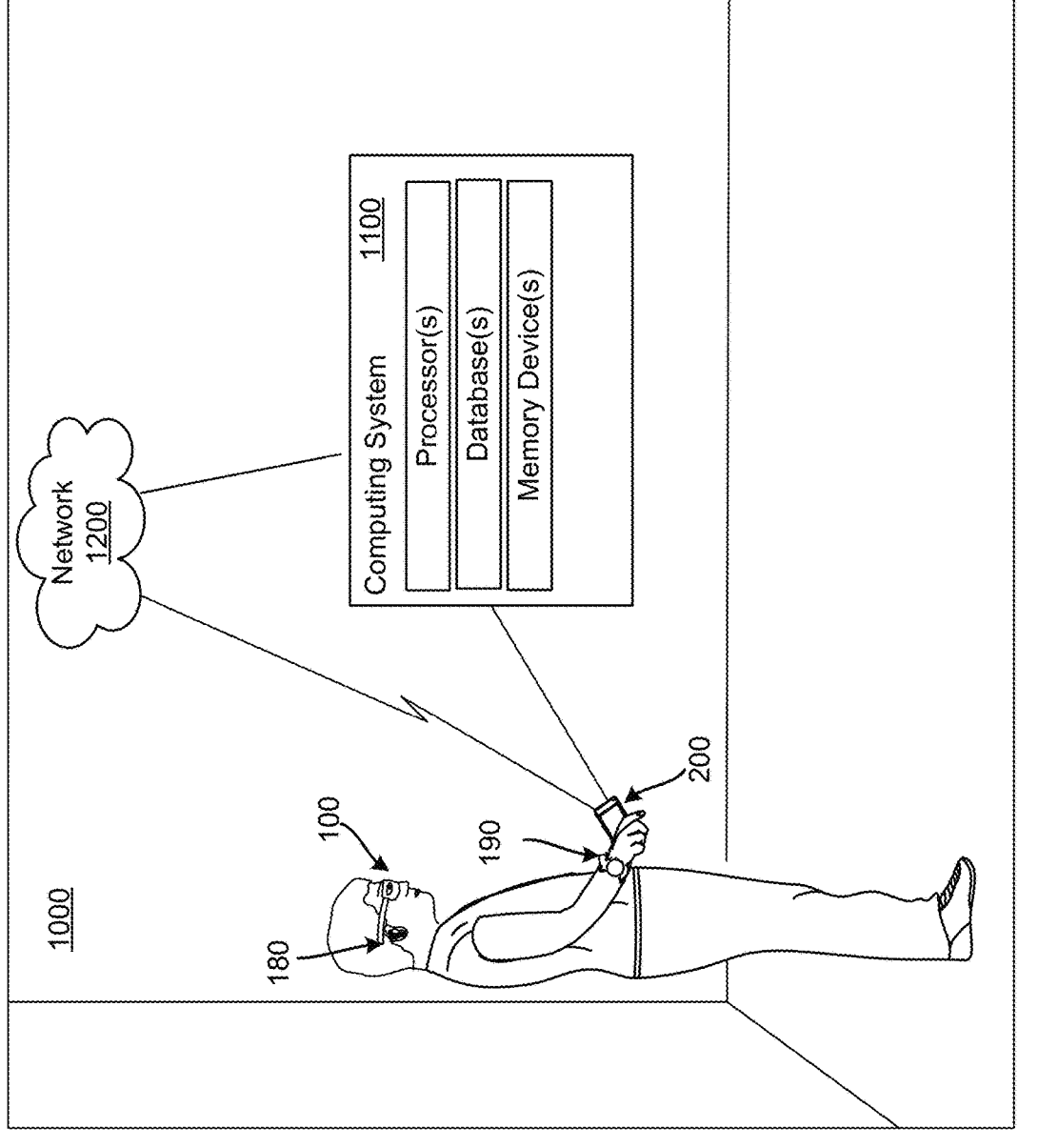
FIG. 1 is a third person view of a user in an ambient environment.

FIG. 1 is a third person view of a user in an ambient environment 1000. FIG. 1 illustrates various wearable devices worn by the user, including a first example wearable device 100 in the form of glasses worn on the head of the user, a second wearable device 180 in the form of ear buds worn in one or both ears of the user, and a third wearable device 190 in the form of a watch worn on the wrist of the user. FIG. 1 includes a mobile device 200 held by the user, in the form of a handheld computing device such as a smart phone. In some examples, the first wearable device 100 and/or the second wearable device 180 and/or the third wearable device 190 may include display capability. In some examples, the first wearable device 100 and/or the second wearable device 180 and/or the third wearable device 190 may include processing capability. In some examples, the example mobile device 200 can access additional computing and processing resources 1100 available to the mobile device 200, via a network 1200 and/or available locally on the mobile device 200. In some examples, the example wearable devices 100, 180, 190 and the example mobile device 200 can communicate with each other and/or with the additional resources 1100 to exchange information, to receive and transmit input and/or output, and the like. The principles to be described herein may be applied to other types of wearable devices not specifically shown in FIG. 1.

Hereinafter, systems and methods will be described with respect to the sizing and/or fitting of the example wearable device 100 from images captured by one or more image sensors of the example mobile device 200 operated by the user, for purposes of discussion and illustration. Principles to be described herein may be applied to images captured by other types of computing devices and/or for the purpose of sizing and/or fitting other types of wearable devices. Hereinafter, systems and methods will be described with respect to the sizing and/or fitting of the example wearable device 100 from images of the face/head of the user, as the example wearable device is a head worn wearable device. Principles to be described herein may be applied to the sizing and/or fitting of other types of wearable devices based on images captured of corresponding portions of the body of the user at which the wearable device is worn.

In some situations, a user may choose to use a computing device (such as the example handheld mobile device 200 shown in FIG. 1, or another computing device) for the virtual sizing and/or fitting of a wearable device, such as the example head mounted wearable device 100. For example, a user may use an application executing on the example mobile device 200 to select glasses for virtual try on and fitting. In order to provide for the virtual sizing and fitting of the head mounted wearable device 100, the user may use an image sensor of the example mobile device 200 to capture one or more images of the face/head of the user. In some examples, the one or more images may be captured by the image sensor via an application executing on the mobile device 200.

In some examples, features and/or landmarks, for example facial features and/or facial landmarks, may be detected within the one or more images captured by the image sensor of the mobile device 200. In some examples, the facial features and/or facial landmarks may be detected by, for example, a recognition engine accessible to the mobile device 200. In some examples, scale, for example, a known scale, may be applied to the detected features and/or landmarks, to associate one or more measurements with the detected features and/or landmarks. The one or more measurements may be processed, for example, by a sizing engine, or a sizing module accessible to the mobile device 200. In some examples, the one or more measurements may be provided to, for example, a machine learning model, to determine one or more wearable devices having a size and/or a configuration that will be compatible with the needs of the user and comfortably fit the user. In some implementations, the machine learning model may be based on a plurality of inputs from a plurality of users, providing sizing and/or fit input correlated with one or more facial measurements associated with the users, and configuration information related to a plurality of wearable devices worn by the users. In some examples, the scale, or the scale value, or the scaling factor, may be a number, or a factor, that can form the basis for a ratio, or a proportion, between elements to be measured. In the examples to be described herein, a known measure associated with a first element detected in the image data may form the basis for a scaling factor that can be applied to determine a measure associated with a second element detected in the image data.

Figure 2A:
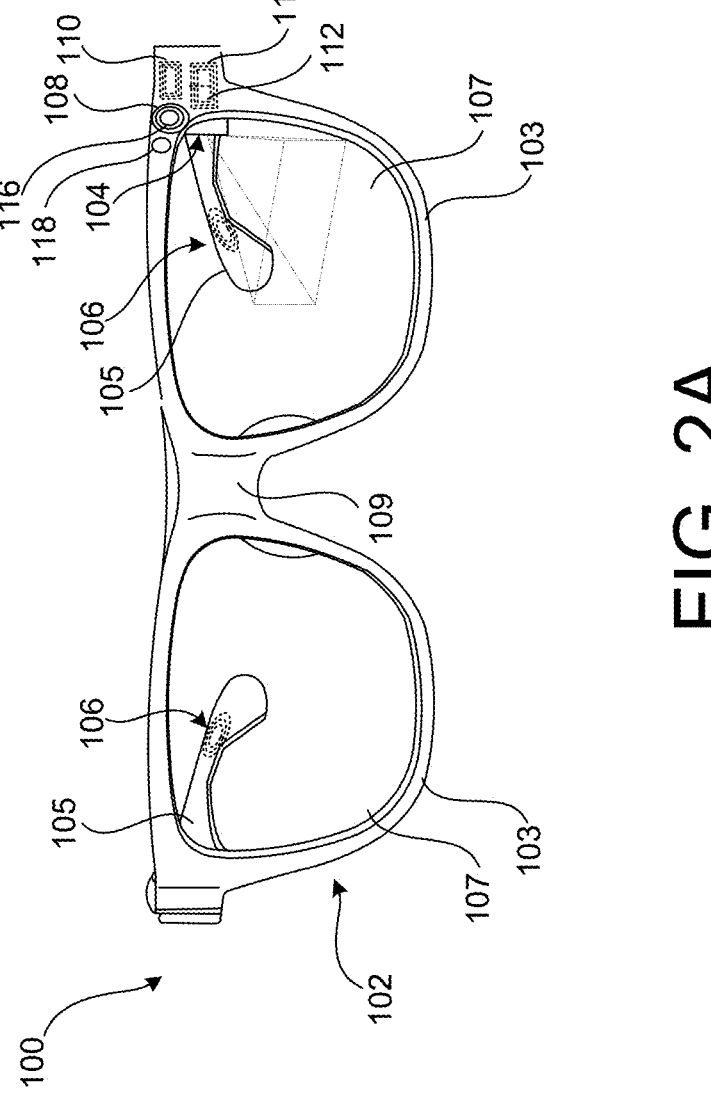
FIG. 2A is a front view of an example wearable device shown in FIG. 1.

FIG. 2A is a front view of the example wearable device 100 shown in FIG. 1. In some implementations, the principles and methods described herein may be applied to the sizing and fitting of the example wearable device 100 in the form of a pair of smart glasses, or augmented reality glasses, that include display capability and/or computing capability. The principles to be described herein may be applied to the sizing and fitting of the example wearable device 100, with or without display capability, and/or with or without computing capability.

As shown in FIG. 2A, the example wearable device 100 includes a frame 102. The frame 102 may include rim portions 103 surrounding glass portion(s) 107, or lenses 107, and arm portions 105 coupled to a respective rim portion 103. In some examples, the lenses 107 may be glass portions that do not necessarily incorporate corrective/prescription parameters. In some examples, the lenses 107 may be corrective/prescription lenses. In some examples, a bridge portion 109 may connect the rim portions 103 of the frame 102.

In an example in which the example wearable device 100 includes display and/or computing capabilities, such as in a pair of smart glasses, or augmented reality glasses, the example wearable device may include a display device 104 coupled in a portion of the frame 102 such as, for example, in the arm portion 105 of the frame 102. An eye box may extend toward the lens(es) 107, for output of content at an output coupler so that content output by the display device 104 may be visible to the user. In some examples, the output coupler may be substantially coincident with the lens(es) 107. The wearable device 100 can also include various other components including, for example, an audio output device 106 (such as, for example, one or more speakers), an illumination device 108, a sensing system 110, a control system 112, at least one processor 114, an outward facing image sensor 116, an audio sensor 118, and the like.

In an example in which the wearable device 100 includes display capability, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

In some implementations, the sensing system 110 may include various sensing devices. In some implementations, the control system 112 may include various control system devices including, for example, one or more processors 114 operably coupled to the components of the control system 112. In some implementations, the control system 112 may include a communication module providing for communication and exchange of information between the wearable device 100 and other external devices.

Figure 2B:
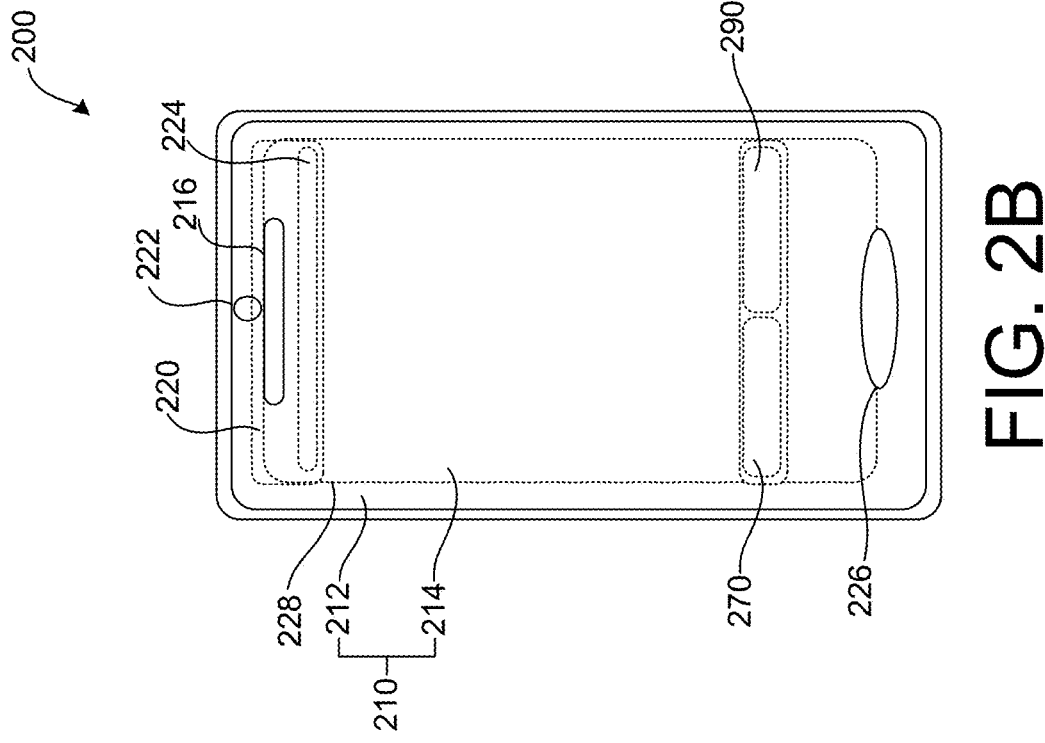
FIG. 2B is a front view of an example mobile device shown in FIG. 1.

FIG. 2B is a front view of the example mobile device 200 shown in FIG. 1. The example mobile device 200 may include an interface device 210. In some implementations, the interface device 210 may function as an input device, including, for example, a touch surface 212 that can receive touch inputs from the user. In some implementations, the interface device 210 may function as an output device, including, for example, a display portion 214 allowing the interface device 210 to output information to the user. In some implementations, the interface device 210 can function as an input device and an output device. The example mobile device 200 may include an audio output device 216, or speaker, that outputs audio signals to the user.

The example mobile device 200 may include a sensing system 220 including various sensing system devices. In some examples, the sensing system devices include, for example, one or more image sensors, one or more position and/or orientation sensors, one or more audio sensors, one or more touch input sensors, and other such sensors. The example mobile device 200 shown in FIG. 2B includes an image sensor 222 included in a front facing camera of the mobile device 200. The example mobile device 200 may include additional image sensors such as, for example, a world facing camera. The example mobile device 200 shown in FIG. 2B includes an inertial measurement unit (IMU) 224 including, for example, position and/or orientation and/or acceleration sensors such as, for example, an accelerometer, a gyroscope, a magnetometer, and other such sensors that can provide position and/or orientation and/or acceleration data. The example mobile device 200 shown in FIG. 2B includes an audio sensor 226 that can detect audio signals, for example, for processing as user inputs. The example mobile device 200 shown in FIG. 2B includes a touch input sensor 228, for example corresponding to the touch surface 212 of the interface device 210. The touch input sensor 228 can detect touch input signals for processing as user inputs. The example mobile device 200 may include a control system 270 including various control system devices. The example mobile device 200 may include a processor 290 to facilitate operation of the mobile device 200.

As noted above, a mobile device such as the example handheld mobile device 200 may be used to capture images of the user, for the virtual sizing and/or fitting of a wearable device. This may allow the user to select and fit a wearable device, such as the example head mounted wearable device 100 described above, without the use of specialized equipment, without the need for a proctored virtual fitting, without access to a retail establishment, and the like.

Numerous different sizing and/or fitting measurements and/or parameters may be taken into account when sizing and fitting the wearable device 100 for a particular user. This may include, for example, wearable fit parameters that take into account how a particular frame 102 fits on a particular user and/or looks and/or feels on a particular user. In some examples, wearable fit parameters may take into account, for example whether the frame 102 is wide enough to be comfortable with respect to the temples of the user, whether the rim portions 103 and bridge portion 109 are sized and/or shaped and/or configured so that the bridge portion 109 can rest comfortably on the bridge of the user's nose, whether the rim portions 103 are sized and/or shaped and/or configured so that the rim portions 103 comfortably meet with the cheeks of the user, whether the arm portions 105 are sized to comfortably rest on the saddle points of the ears of the user, and other such comfort related considerations. In some examples, wearable fit parameters may take into account as-worn parameters including how the user naturally wears the wearable device 100, such as, for example, head posture/ how the user naturally holds their head, how the user positions the wearable computing device 100 relative to his/her face, and the like. In some examples, wearable fit parameters may also take into account whether the size and/or shape and/or contour of the frame 102 is aesthetically pleasing to the user, and is compatible with the user's facial features. Systems and methods, in accordance with implementations described herein, provide for the prediction of wearable fit for one or more head mounted wearable devices for a particular user. The predicted wearable fit provides a prediction of actual fit of the head mounted wearable device on the user. In contrast, existing virtual fitting systems may simply provide a rendering of the head mounted wearable device superimposed on an image of the user, with the rendering manipulated so that the wearable device appears to fit the user, regardless of actual sizing and/or configuration of the physical wearable device compared to the body part of the user on which the wearable device is worn.

Display fit parameters, or display fit measurements may be taken into account when sizing and fitting the wearable device 100 including display capability. Display fit parameters may facilitate configuration of the display device 104 so that content displayed by the display device 104 is visible to the user. In some implementations, display fit parameters may be used to provide at least a set level of gazability, corresponding to an amount, or portion, or percentage of the display of content that is visible to the user at a set brightness level at a peripheral portion of the field of view of the user.

In some examples, ophthalmic fit parameters, or ophthalmic fit measurements may be taken into account when sizing and fitting the wearable device 100 in which the lenses 107 are prescription, or corrective lenses. Ophthalmic fit measurements may include, for example, a pupil height PH (a distance from a center of the pupil to a bottom of the lens 107), an interpupillary distance IPD (a distance between the pupils), a monocular pupil distance, for example, a left pupil distance LPD (a distance from a central portion of the bridge of the nose to the left pupil) and a right pupil distance RPD (a distance from the central portion of the bridge of nose to right pupil), a pantoscopic angle PA (an angle defined by the tilt of the lens 107 with respect to vertical), a vertex distance V (a distance from the cornea to the lens 107), and other such parameters, or measures.

A system and method, in accordance with implementations described herein, may use a computing device to capture image data from which one or more facial landmarks and/or facial features can be detected. Detection of the one or more facial landmarks and/or facial features can be used to determine one or more measurements that can be used to provide for the sizing and/or fitting of a head mounted wearable device for the user. In some examples, the one or more measurements can be processed by a model, for example, a machine learning model, to size and/or fit one or more head mounted wearable device configurations for the user based on the one or more measurements. Sizing and/or fitting in this manner may provide the user with an accurate characterization of fit of actual head mounted wearable devices on the head/face of the user, rather than just a simulated characterization involving a rendered overlay on an image of the user without regard to actual size of the wearable device. Sizing and/or fitting in this manner may allow the user to conduct self-directed selection and sizing/ fitting of the head mounted wearable device, without the need for a proctored or supervised virtual fitting and/or access to a retail establishment.

Figure 3:
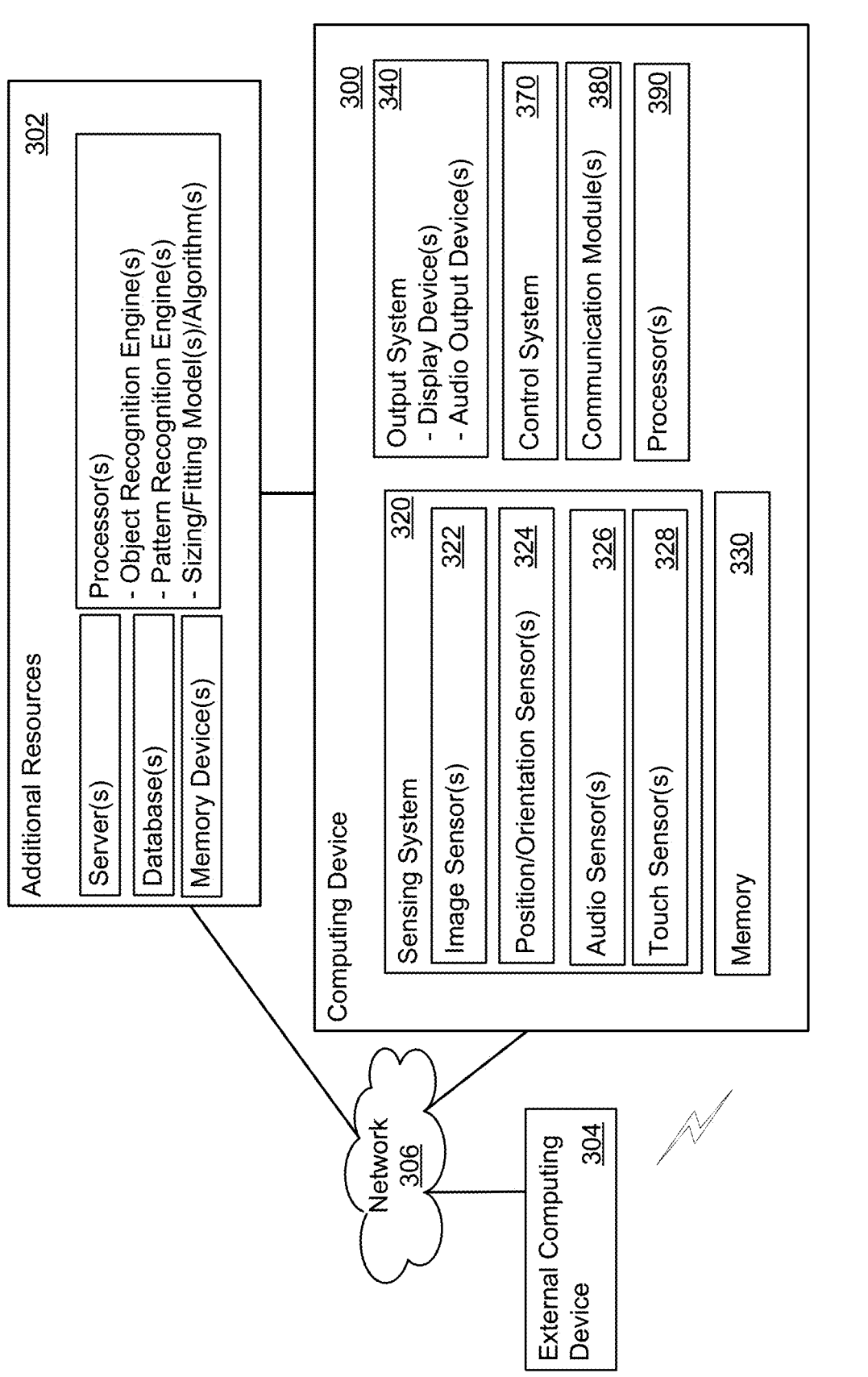
FIG. 3 is a block diagram of a system, in accordance with implementations described herein.

FIG. 3 is a block diagram of an example system for determining sizing and/or fitting a wearable device based on image data captured by a computing device. The system may include one or more computing devices 300. The computing device 300 can access additional resources 302 to facilitate the selection, sizing and fitting of the wearable device. In some examples, the additional resources may be available locally on the computing device 300. In some examples, the additional resources may be available to the computing device 300 via a network 306. The additional resources 302 may include, for example, server computer systems, processors, databases, memory storage, and the like. The computing device 300 can operate under the control of a control system 370. The computing device 300 can communicate with one or more external devices 304 (another wearable computing device, another mobile computing device and the like) either directly (via wired and/or wireless communication), or via the network 306. In some implementations, the computing device 300 includes a communication module 380 to facilitate external communication. In some implementations, the computing device 300 includes a sensing system 320 including various sensing system components including, for example one or more image sensors 322, one or more position/orientation sensor(s) 324 (including for example, an inertial measurement unit, accelerometer, gyroscope, magnetometer and the like), one or more audio sensors 326 that can detect audio input, one or more touch input sensors 328 that can detect touch inputs, and other such sensors. The computing device 300 can include more, or fewer, sensing devices and/or combinations of sensing devices.

In some implementations, the computing device 300 may include one or more image sensor(s) 322. The image sensor (s) 322 may include, for example, cameras such as, for example, forward facing cameras, outward, or world facing cameras, and the like that can capture still and/or moving images of an environment outside of the computing device 300. The still and/or moving images may be displayed by a display device of an output system 340, and/or transmitted externally via a communication module 380 and the network 306, and/or stored in a memory 330 of the computing device 300. The computing device 300 may include one or more processor(s) 390. The processors 390 may include various modules or engines configured to perform various functions. In some examples, the processor(s) 390 may include object recognition module(s), pattern recognition module(s), configuration identification modules(s), and other such processors. The processor(s) 390 may be formed in a substrate configured to execute one or more machine executable instructions or pieces of software, firmware, or a combination thereof. The processor(s) 390 can be semiconductor-based including semiconductor material that can perform digital logic. The memory 330 may include any type of storage device that stores information in a format that can be read and/or executed by the processor(s) 390. The memory 330 may store applications and modules that, when executed by the processor(s) 390, perform certain operations. In some examples, the applications and modules may be stored in an external storage device and loaded into the memory 330.

As noted above, in some examples, the additional resources 302 may be available locally on the computing device 300. In some examples, the additional resources 302 may be available to the computing device 300 via the network 306. In some examples, some of the additional resources 302 may be available locally on the computing device 300, and some of the additional resources 302 may be available to the computing device 300 via the network 306. In some examples, the additional resources 302 may include various processing engines and/or modules, models (including machine learning models), algorithms and the like. For example, the additional resources 302 may include object and/or pattern recognition engines. In some examples, the object and/or pattern recognition engines may detect and/or identify one or more features in image data transmitted thereto for processing. The additional resources 302 may include sizing and/or fitting models and/or algorithms. The sizing and/or fitting models and/or algorithms may facilitate the prediction of wearable fit of wearable devices for a particular user. In some examples, the sizing and/or fitting models and/or algorithms may predict whether a particular wearable device will comfortably fit a particular user and/or properly function for a particular user. In some examples, the sizing and/or fitting models and/or algorithms may include one or more machine learning models. The one or more machine learning models and/or algorithms may have a basis, and make use of, sizing and/or fitting data associated with a relatively large population of users and a relatively large sampling of wearable devices in predicting the sizing and/or fitting of a wearable device for a particular user.

Figure 4A:
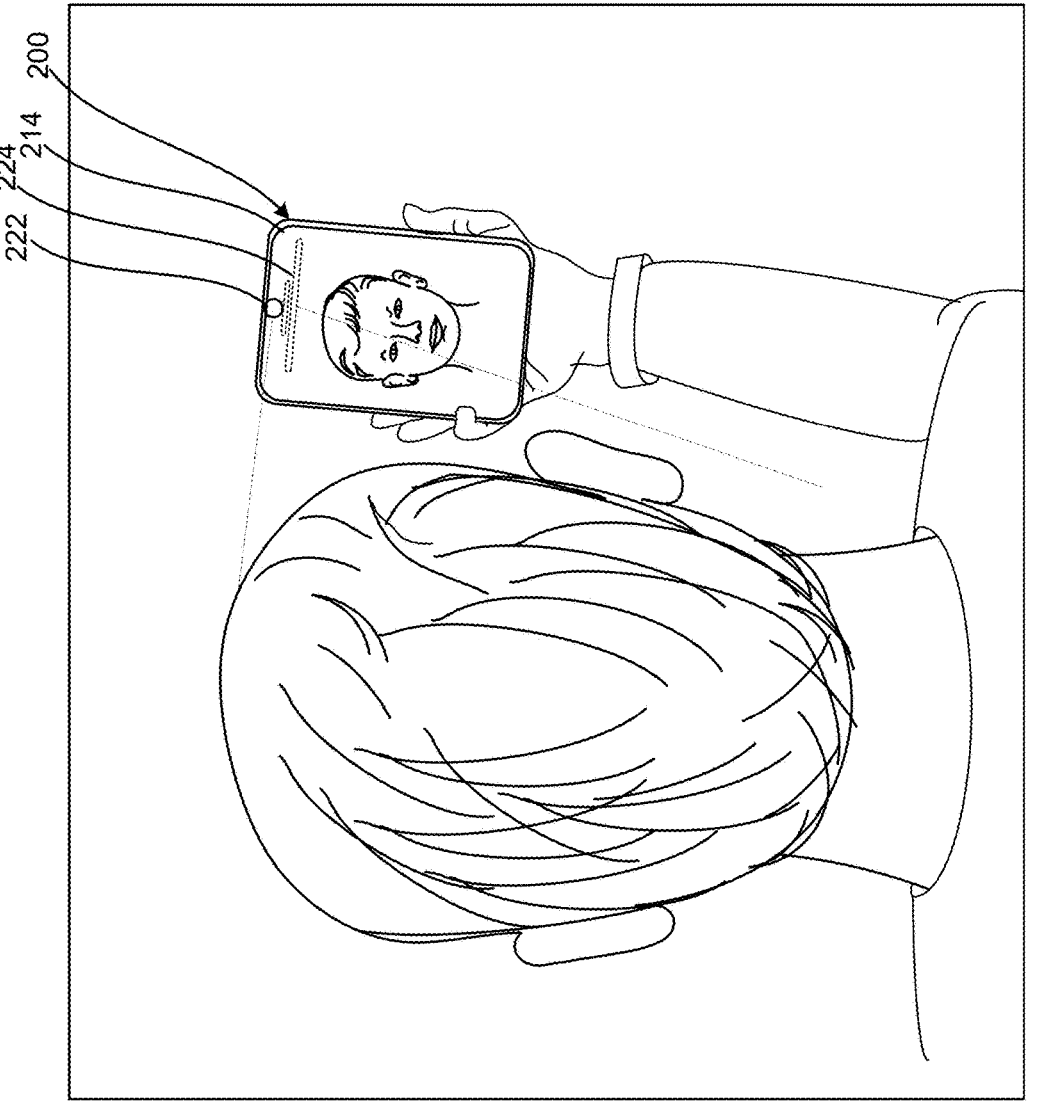
FIG. 4A illustrates an example computing device in an image capture mode of operation.

FIG. 4A illustrates the use of a computing device, such as the example handheld mobile device 200 shown in FIGS. 1 and 2B, to capture images for the virtual selection and/or fitting of a wearable device such as the example head mounted wearable device 100 shown in FIGS. 1, 2A and 2B. In particular, FIG. 4A illustrates the use of the handheld mobile device 200 to capture images of the head and face of the user using the image sensor 222 included in a front facing camera of the mobile device 200, for the sizing and/or fitting of the head mounted wearable device 100. The principles to be described herein can be applied to other types of computing devices and/or to the selection and/or sizing and/or fitting of other types of wearable devices.

In the example shown in FIG. 4A, the user is holding the example mobile device 200 so that the head and face of the user is in the field of view of the image sensor 222 of the mobile device 200. In particular, the head and face of the user is in the field of view of the image sensor 222 of the front facing camera of the mobile device 200, so that the image sensor 222 can capture images of the head and face of the user. In some examples, the images captured by the image sensor 222 may be displayed to the user on the display portion 214 of the mobile device 200, so that the user can verify that the head and face are captured within the field of view of the image sensor 222.

Figure 4B:
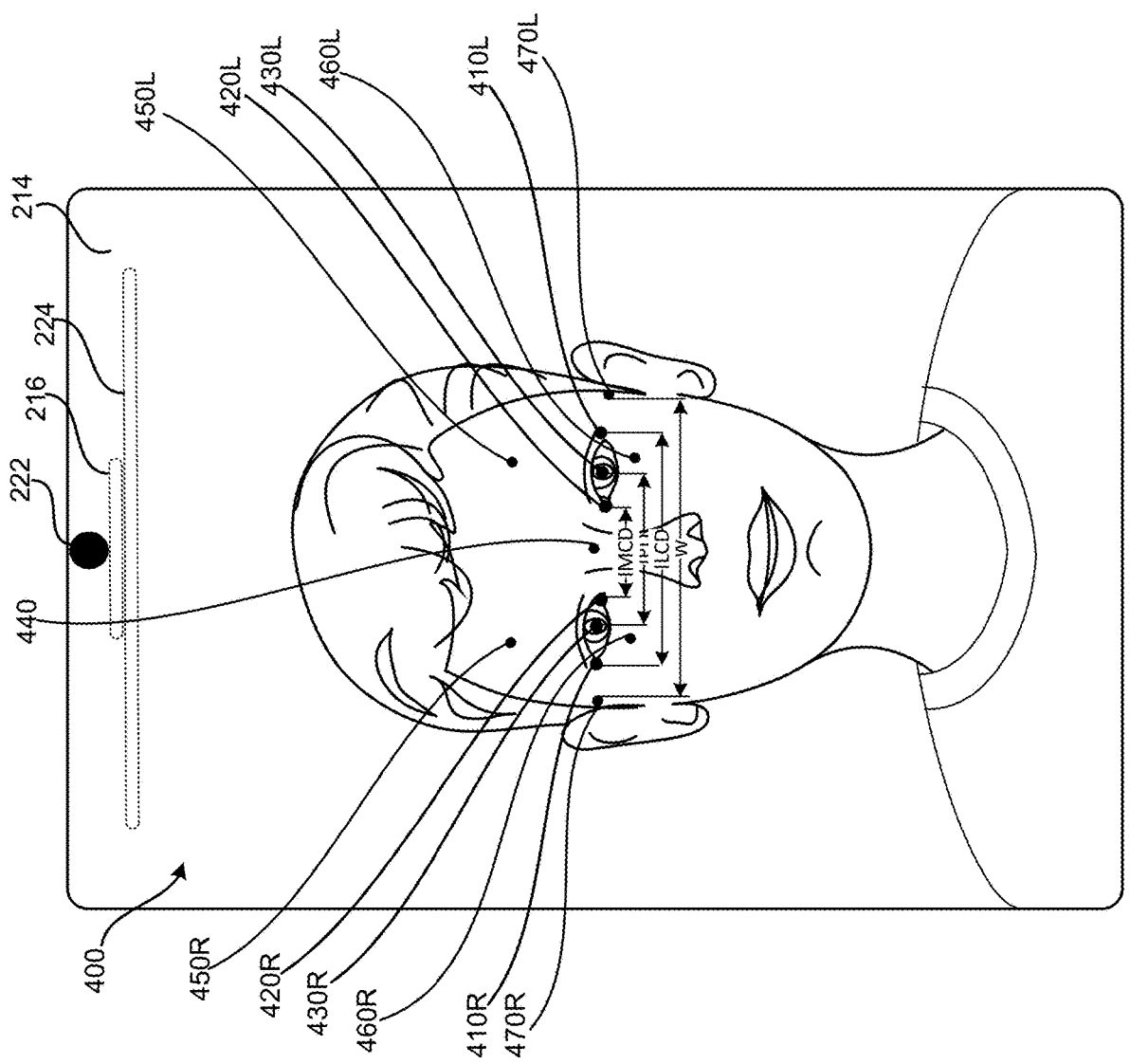
FIGS. 4B and 4C illustrate example facial landmarks and associated fit parameters captured by operation of the computing device shown in FIG. 4A.

FIG. 4B illustrates an example image 400 captured by the image sensor 222 of the mobile device 200 during an image data capture process using the mobile device 200 operated by the user as shown in FIG. 4A. For example, the image 400 may be captured by the user operating the mobile device 200, through an application executing on the mobile device 200. In FIG. 4B, the image 400 is displayed on the display portion 214 of the mobile device 200, allowing the user to visually verify that the captured image data includes the head and face of the user. In some examples, a self-portrait mode, or a selfie mode, may be invoked for the capture of the substantially frontal image 400 captured by the image sensor 222 of the front facing camera of the mobile device 200.

The image data captured by the image sensor 222 may be processed, for example, by resources available to the mobile device 200 as described above (for example, the additional resources 302 described above with respect to FIG. 3) to detect one or more features, or landmarks, and in particular, one or more facial features or landmarks. For example, the image data captured by the image sensor 222 may be processed, for example, by a recognition engine of the additional resources 302, to detect and/or identify various fixed features and/or landmarks in the image data captured by the image sensor 222. In the example shown in FIG. 4B, various example facial landmarks have been identified in the example image 400. At least some of the example facial landmarks may represent facial landmarks that remain substantially fixed, even in the event of changes in facial expression and the like. The example facial landmarks and/or features may be facial landmarks and/or features from which one or more fit parameters may be determined that can be used in the prediction of fit of the head mounted wearable device 100.

In the example shown in FIG. 4B, example facial landmarks include a first landmark 410R representing an outer corner of the right eye, and a second landmark 410L representing an outer corner of the left eye. A distance between the first landmark 410R and the second landmark 410L may represent an inter-lateral commissure distance (ILCD). The first landmark 410R and the second landmark 410R remain relatively fixed, or relatively stable, regardless of eye gaze direction, changes in expression, blinking and the like. The resulting ILCD may also remain relatively fixed, or relatively stable, thus defining a first fit parameter. The resulting ILCD may thus provide a relatively accurate facial measurement from which sizing and/or fitting of the head mounted wearable device 100 may be based.

In the example shown in FIG. 4B, example facial landmarks include a third landmark 420R representing an inner corner of the right eye, and a fourth landmark 420L representing an inner corner of the left eye. A distance between the third landmark 420R and the fourth landmark 420L may represent an inter-medial commissure distance (IMCD). The third landmark 420R and the fourth landmark 420R remain relatively fixed, or relatively stable, regardless of eye gaze direction, changes in facial expression, blinking and the like. The resulting IMCD may also remain relatively fixed, or relatively stable, and thus provide a second, relatively accurate fit parameter from which sizing and/or fitting of the head mounted wearable device 100 may be based.

In the example shown in FIG. 4B, example facial landmarks include a fifth landmark 430R representing a pupil center of the right eye, and a sixth landmark 430L representing a pupil center of the left eye. A distance between the fifth landmark 430R and the sixth landmark 430R may represent an inter-pupillary distance (IPD). IPD may remain relatively fixed, or relatively stable, provided a distance gaze is sustained.

In the example shown in FIG. 4B, a facial landmark 440 may be detected in the image data, representing a top of the nose bridge of the user, at a point where the bridge portion 109 of the head mounted wearable device 100 would rest on the nose. Facial landmarks 450R and 450L at the right and left portions of the temple, respectively, and facial landmarks 460R and 460L, at the right and left cheekbones, respectively, may be detected. In some examples, the facial landmarks 450R, 450L, 460R and 460L may represent facial landmarks defining a bounding area, or a bounding quadrant of the front portion of the frame 102 of the head mounted wearable device 100. Facial landmarks 470R and 470L may be detected at left and right peripheral portions, respectively, of the face and/or head of the user, at a point where the front portion of the frame 102 is coupled to the arm portions 105, and the arm portions 105 would be fitted to the side of the head of the user, to define a head width W. Head width may define a third fit parameter that remains relatively stable, regardless of facial expression.

FIG. 4B illustrates some example facial features and/or landmarks that can be detected within image data captured by the image sensor 222 of the mobile device 200. More, or fewer facial features and/or landmarks may be detected in the image data captured by the image sensor 222 of the mobile device 200. ILCD and head width W are illustrated schematically in FIG. 4C. Hereinafter, the prediction of sizing and or fitting of the head mounted wearable device 100 will be described with respect to the use of fit parameters including ILCD (the distance between the fixed landmarks 410R and 410L), or head width W (the distance between the fixed landmarks 470R and 470L), or both ILCD and head width W, simply for purposes of discussion and illustration. Other distances between other pairs of fixed landmarks, having a distance therebetween that would remain substantially unchanging, or static, could also be used, instead of or in addition to ILCD and/or head width W.

One or more of the fixed facial features, or fixed landmarks, and in particular, a measurement associated with one or more of the fixed facial features, or fixed landmarks, may be processed by, for example, a machine learning model and associated algorithms to size and/or fit the head mounted wearable device 100 for the user.

A scale, for example, a known scale value or a scale value determined during the image capture process, may be applied to determine a measurement associated with one or more of the fixed landmarks or features detected in the image data. In some examples, a reference object having a known scale may be included in an image of the head and face of the user captured by the image sensor 222 of the mobile device 200 as part of the image capture process. In some examples, a known scale value, such as, for example, a known IPD, may be provided by the user during the sizing and fitting process. In some examples, a scale value may be determined during the image capture process based on some of the fixed facial landmarks detected in a series of images captured during the image capture process, combined with position and/or orientation data associated with the mobile device 200. For example, detected fixed facial landmarks and/or features may be combined with data provided by the IMU 224 of the mobile device 200 as the series of images is captured, without the use of a reference object or a previously known measurement. The scale value, however obtained, may be applied to the two dimensional array of pixels captured in the image, with the selected fixed facial features and/or landmarks being associated with respective two-dimensional coordinate positions.

Figure 4C:
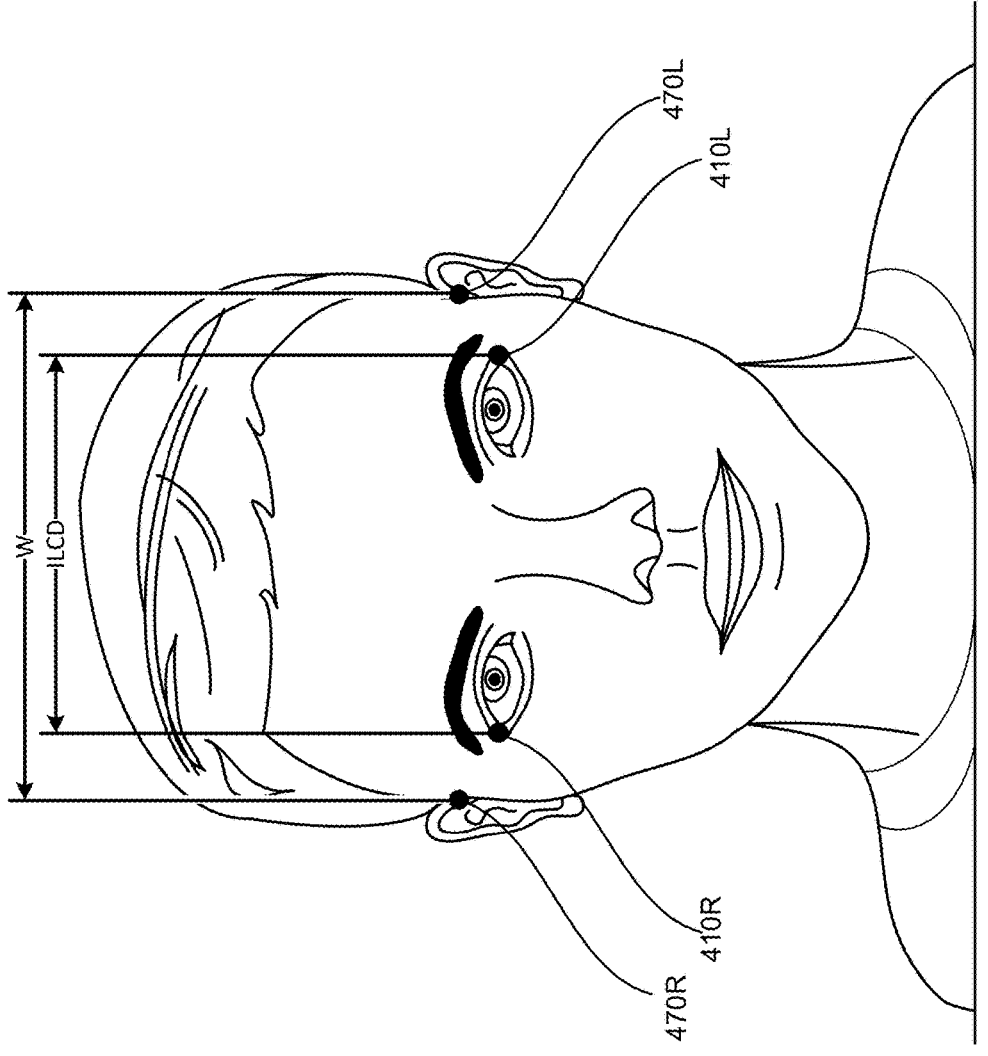

For example, the scale value, however obtained, may be applied to the detected ILCD shown in FIGS. 4B and 4C to calculate an actual measurement of the ILCD of the user. As ILCD remains substantially fixed, or substantially static and substantially unaffected by changes in facial expression and the like, the application of the scale value to the ILCD may yield a relatively accurate measurement of ILCD. Similarly, scale value, however obtained, may be applied to, for example, determine a distance between the right facial landmark 470R and the left facial landmark 470L to determine head width W that may be used in the sizing and/or fitting of the head mounted wearable device 100.

Figure 5A:
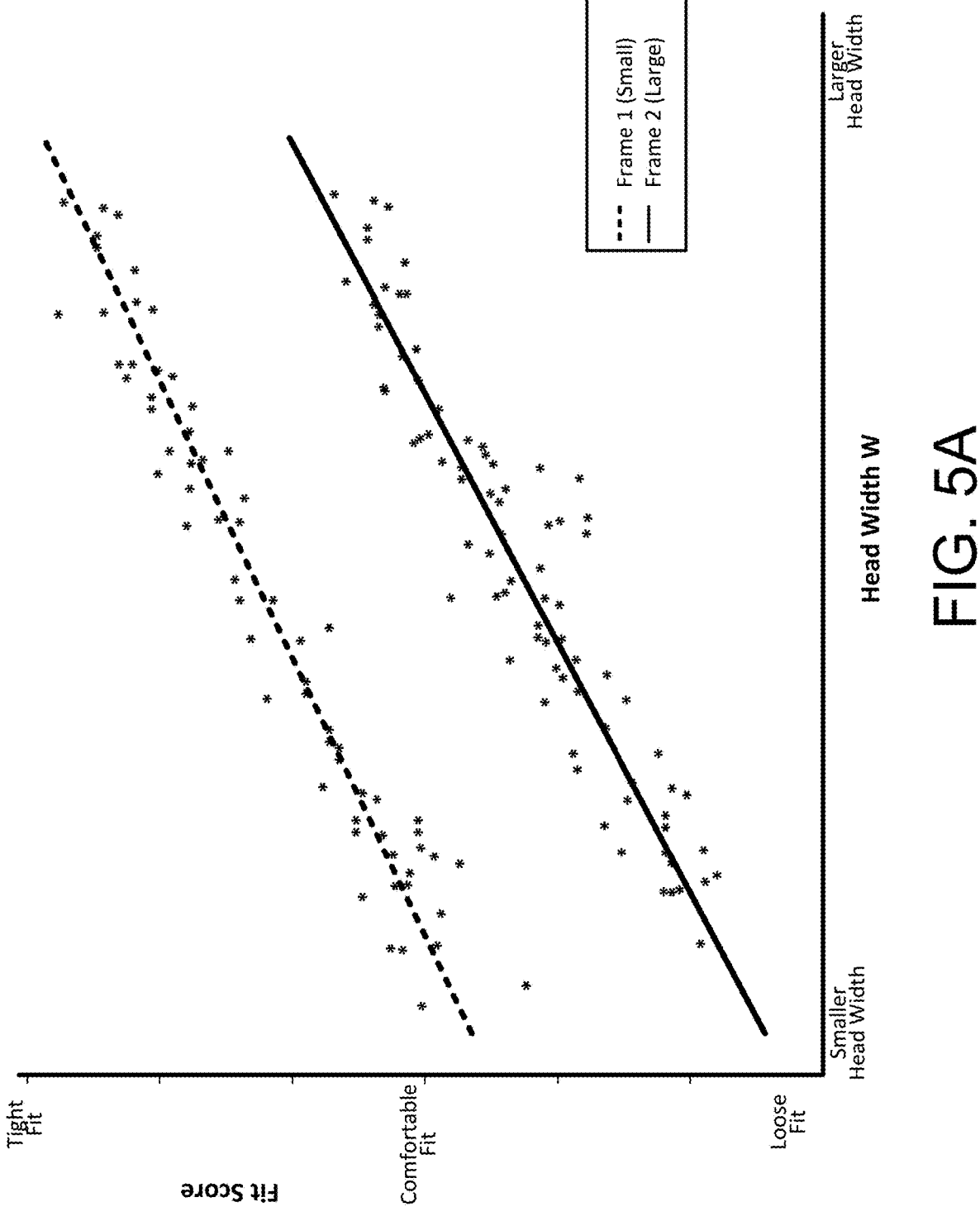
FIGS. 5A and 5B are graphs of example data related to the prediction of sizing and/or fitting of a head mounted wearable device based on image data.
Figure 5B:
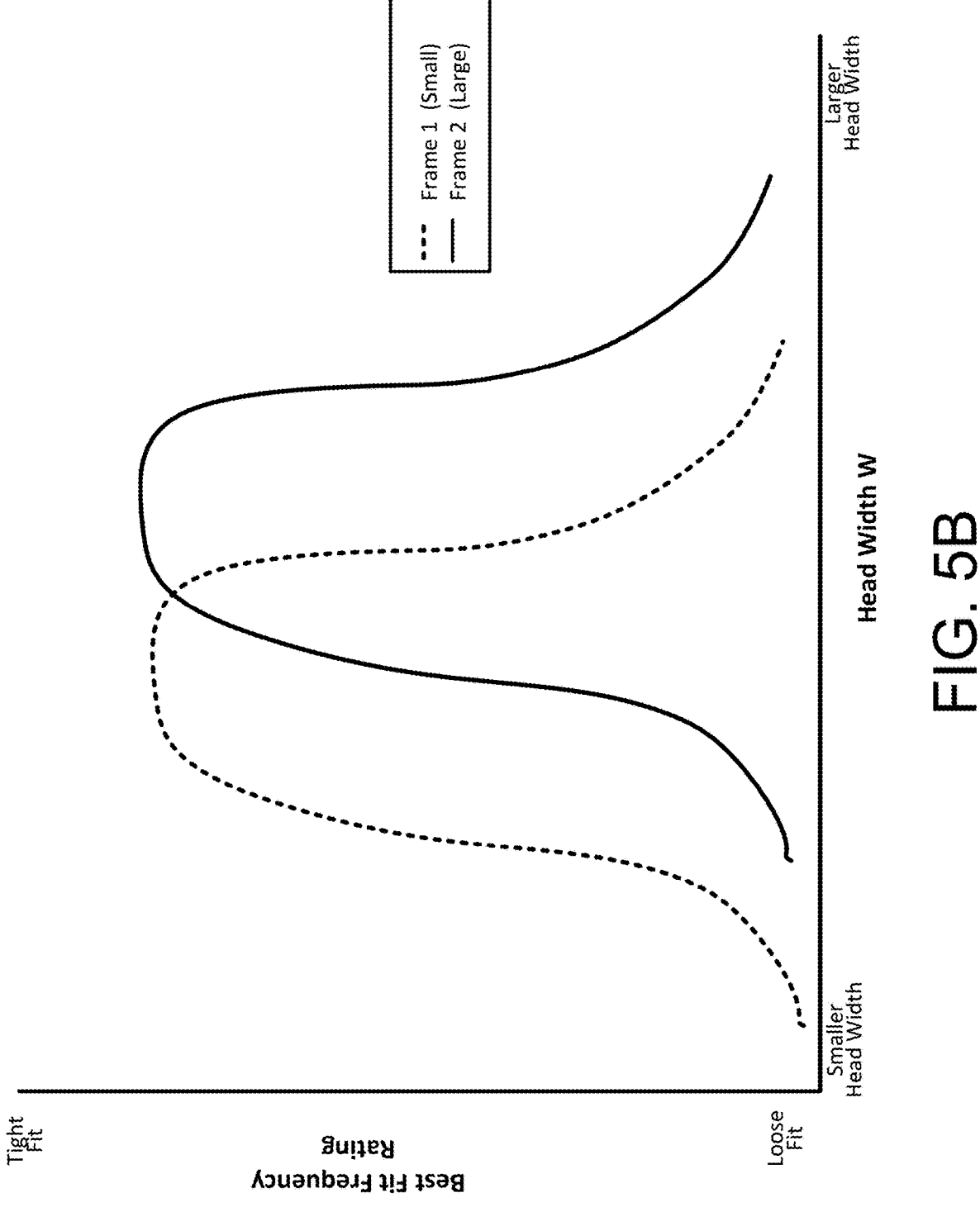

FIGS. 5A and 5B are graphs of example data related to the prediction of sizing and/or fitting of a head mounted wearable device based on image data obtained as described above. In particular, the graphs shown in FIGS. 5A and 5B represent data used to train a machine learning model for the prediction of sizing and/or fitting of the head mounted wearable device 100. The graphs shown in FIGS. 5A and 5B represent data related to the fit of two different example frames, as scored by a plurality of users having different head widths, in a range varying from a relatively small head width (for example, on the order of approximately 120 mm) to a relatively large head width (for example, on the order of approximately 220 mm). In the graphs shown in FIGS. 5A and 5B, the example frames are configured differently, including a first frame having a relatively smaller size (for example, a relatively smaller width spanning across the rim portions 103 and bridge portion 109), and a second frame having relatively larger size (for example, a relatively smaller width spanning across the rim portion 103 and bridge portion 109).

FIG. 5A is a line graph of mean fit scores for the two differently sized and/or differently configured frames (i.e., the first, relatively smaller frame and the second, relatively larger frame, in this example), scored by a plurality of users having a range of head widths. FIG. 5B illustrates a distribution of score frequency across a range of head widths for the first (relatively smaller) frame and the second (relatively larger) frame. For example, each of the curves shown in FIG. 5B represents a distribution of the frequency of selection of the respective frame across the range of head widths. In this data, the two differently sized and/or differently configured example frames are scored on an established scale, for example a numerical scale. On this scale, a lower score may represent a somewhat loose fit of the particular frame being scored by a user having a particular head width W. On this scale, a higher score may represent a somewhat tight fit of the particular frame being scored by a user having a particular head width W. On this scale, a middle range score may represent a comfortable fit, or a best fit of the particular frame being scored by a user having a particular head width W.

The graphs shown in FIGS. 5A and 5B represent just some of the types of data that can be used, for example by a machine learning model, to predict fit, for example wearable fit, for a user based on head size. Other data, encompassing a plurality of other sizes and/or configurations of frames, scored by users having a plurality of different head widths W, ILCDs, IMCDs, IPDs and the like, may also form the basis of a machine learning model and associated algorithm(s) used to predict the probability of fit of a head mounted wearable device for a user. In some examples, this type of data may be used to predict, or determine a probability of whether or not a particular frame will fit a particular user based on the determination of head width W and/or ILCD and/or IMCD and/or other fit parameter as described above, for example in a situation in which a user has selected one or more frames for consideration. In some examples, this type of data may be used to predict which frames, of a plurality of available frames, are likely to fit a particular user based on the determination of head width W as described above.

Figure 6:
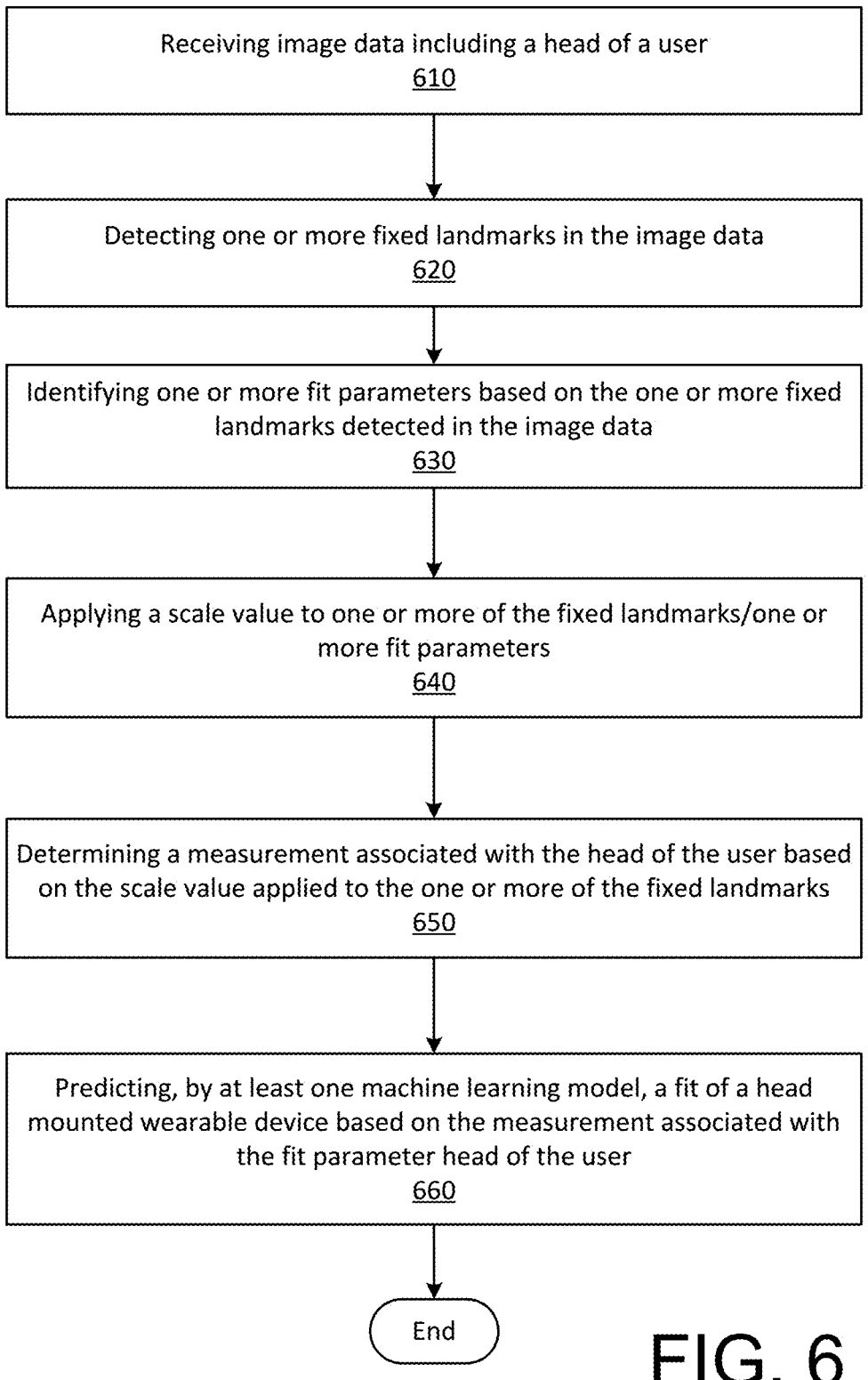
FIG. 6 is a flowchart of an example method, in accordance with implementations described herein.

FIG. 6 is a flowchart of an example method 600 of predicting fit of a head mounted wearable device, in accordance with implementations described herein. As noted above, fit of the head mounted wearable device may be predicted based on a fixed parameter or measurement such as, for example, head width, or other fixed parameter or measurement. The fixed measurement may be detected in image data captured by an image sensor of a user operated device such as the mobile device 200 described above, or other user operated device including an image sensor that can be operated by the user to capture one or more images of the head and/or face of the user. The example method 600 illustrates operations performed in sequential order, for purposes of discussion and illustration. Operations may be executed in a different order than shown, or in a parallel or overlapping manner.

Image data including a head and/or face of a user may be received (block 610) by, for example, a processor of a computing device. In some examples, the image data may be captured by a user operating a computing device (such as, for example, the mobile device 200 described above). The user may initiate image capture functionality of the computing device via, for example, an application executing on the computing device. The image data may be processed, for example, by a recognition engine accessible to the computing device to detect one or more fixed landmarks or features (block 620). The one or more fixed landmarks or features may include facial features that remain substantially static such as, for example, facial landmarks from which one or more fit parameters may be determined (block 630). For example, fit parameters such as head width W, ILCD, IMCD and the like can be determined, as described above. A scale value may be applied to one or more of the fit parameters to determine a measurement associated with the fit parameter, representing a measurement associated with the head of the user (block 640, block 650). The fit parameter/associated head measurement may be provided to a machine learning model as described above (block 660) to predict fit for a head mounted wearable device. For example, the machine learning model may access stored fit data as described above with respect to FIGS. 5A and 5B, to predict or provide a probability or likelihood of wearable fit of one or more head mounted wearable devices for the user based on the fit parameter/associated head measurement.

FIG. 7 illustrates an example of a computer device 700 and a mobile computer device 750, which may be used with the techniques described here. The computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display), and LED (Light Emitting Diode) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 790 to generate an augmented environment for viewing inserted content within the physical space. For example, one or more sensors included on a computing device 750 or other computing device depicted in the figure, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790. The user's interactions with the computing device may be translated to interactions with a user interface generated in the AR environment for a controllable device.

In some implementations, a computing device 750 may include a touchscreen. For example, a user can interact with the touchscreen to interact with a user interface for a controllable device. For example, the touchscreen may include user interface elements such as sliders that can control properties of the controllable device.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:

capturing, via an application executing on a computing device operated by a user, image data including a head of the user;

associating a fit parameter with a distance between two landmarks detected in the image data;

calculating a measurement associated with the fit parameter, including applying a scale value to the distance between the two landmarks in the image data; and predicting, using at least one machine learning model, a probability of fitting a wearable device for the user based on the measurement associated with the fit parameter;

wherein the at least one machine learning model is based on indicators of wearable fit of a plurality of differently configured wearable devices for a plurality of different measurements associated with the fit parameter.

2. The computer-implemented method of claim 1, wherein predicting the probability of the fitting of the wearable device on the head of the user includes:

accessing, by the at least one machine learning model, fit scoring data associated with the wearable device; and determining the probability of fitting based on the fit scoring data and the measurement associated with the fit parameter.

3. The computer-implemented method of claim 2, wherein the fit scoring data includes numerical scores of wearable fit of a plurality of differently configured wearable devices for a plurality of different measurements associated with the fit parameter.

4. The computer-implemented method of claim 2, wherein the fit scoring data includes numerical scores of wearable fit of the wearable device across a plurality of different head width measurements.

5. The computer-implemented method of claim 1, wherein determining the measurement associated with the fit parameter includes determining at least two of a head width measurement, an inter-lateral commissure distance measurement, or an inter-medial commissure distance measurement.

6. The computer-implemented method of claim 1, further comprising detecting the two landmarks from a plurality of facial landmarks detected in the image data, wherein determining the measurement associated with the fit parameter includes:

determining a distance between any two of the plurality of facial landmarks detected in the image data having a static distance therebetween; and associating a measurement with the distance between the any two of the plurality of facial landmarks.

7. A non-transitory computer-readable medium storing executable instructions that when executed by at least one processor of a computing device are configured to cause the at least one processor to:

capture, via an application executing on the computing device, image data including a head of a user;

detect two landmarks in the image data;

associate a fit parameter with a distance between the two landmarks in the image data;

calculate a measurement associated with the fit parameter, including applying a scale value to the distance between the two landmarks in the image data; and predict, using at least one machine learning model, a probability of fitting of a wearable device for the user based on the measurement associated with the fit parameter;

wherein the at least one machine learning model is based on indicators of wearable fit of a plurality of differently configured wearable devices for a plurality of different measurements associated with the fit parameter.

8. The non-transitory computer-readable medium of claim 7, wherein the instructions cause the at least one processor to:

detect the two landmarks in the image data from amongst a plurality of facial landmarks in the image data.

9. The non-transitory computer-readable medium of claim 8, wherein the instructions cause the at least one processor to:

access, by the at least one machine learning model, fit scoring data associated with the wearable device; and determine the probability of fitting based on the fit scoring data and the measurement associated with the fit parameter.

10. The non-transitory computer-readable medium of claim 9, wherein the fit scoring data includes numerical scores of wearable fit of a plurality of differently configured wearable devices for a plurality of different measurements associated with the fit parameter.

11. The non-transitory computer-readable medium of claim 9, wherein the fit scoring data includes numerical scores of wearable fit of the wearable device across a plurality of different head width measurements.

12. The non-transitory computer-readable medium of claim 8, wherein the instructions cause the at least one processor to:

determine a distance between any two of the plurality of facial landmarks having a static distance therebetween; and associate a measurement with the distance between the any two of the plurality of facial landmarks.

13. The non-transitory computer-readable medium of claim 7, wherein the instructions cause the at least one processor to determine the fit parameter, including:

determine at least two of a head width measurement, an inter-lateral commissure distance measurement, or an inter-medial commissure distance measurement based on a plurality of facial landmarks detected in the image data.

14. A system, comprising:

a computing device, including:

an image sensor;

at least one processor; and a memory storing instructions that, when executed by the at least one processor, cause the at least one processor to:

capture, via an application executing on the computing device, image data including a head of a user of the computing device;

detect two landmarks in the image data;

associate a fit parameter with a distance between the two landmarks in the image data;

calculate a measurement associated with the fit parameter, including applying a scale value to the distance between the two landmarks; and predict, using at least one machine learning model, a probability of fitting of a wearable device on the head of the user based on the measurement associated with the fit parameter;

wherein the at least one machine learning model is based on indicators of wearable fit of a plurality of differently configured wearable devices for a plurality of different measurements associated with the fit parameter.

15. The system of claim 14, wherein the instructions cause the at least one processor to:

detect the two landmarks in the image data from amongst a plurality of facial landmarks in the image data.

16. The system of claim 15, wherein the instructions cause the at least one processor to:

access, by the at least one machine learning model, fit scoring data associated with the wearable device; and determine the probability of fit based on the fit scoring data and the measurement associated with the fit parameter.

17. The system of claim 16, wherein the fit scoring data includes numerical scores of wearable fit of a plurality of differently configured wearable devices for a plurality of different measurements associated with the fit parameter.

18. The system of claim 15, wherein the instructions cause the at least one processor to:

determine a distance between any two of the plurality of facial landmarks having a static distance therebetween; and associate a measurement with the distance between the any two of the plurality of facial landmarks.

\* \* \* \* \*